United States Patent [19]

Pfannkuch et al.

[11] 4,373,156

[45] Feb. 8, 1983

[54] APPARATUS AND METHOD FOR PRODUCING RAPID, HIGH RESOLUTION HARD COLOR COPIES FROM COMPUTER-BASED GRAPHICS AND DIGITAL IMAGE PROCESSING SYSTEMS

[75] Inventors: Robert B. Pfannkuch, Northfield, Ill.; Fred W. Grab, Mission Viejo, Calif.

[73] Assignee: Bell & Howell Company, Chicago, Ill.

[21] Appl. No.: 139,941

[22] Filed: Apr. 11, 1980

[51] Int. Cl.³ .............................................. G09G 1/28
[52] U.S. Cl. .................................... 340/703; 340/702; 346/46; 346/110 R; 358/332; 358/334
[58] Field of Search ................... 340/703, 702; 178/15; 346/46, 110 R; 358/9, 130

[56] References Cited

U.S. PATENT DOCUMENTS

| | | | |
|---|---|---|---|
| 3,164,685 | 1/1965 | Banning, Jr. et al. | 358/9 |
| 3,274,581 | 9/1966 | Moore et al. | 178/15 |
| 3,546,378 | 12/1970 | Karikawa | 346/110 R |
| 3,626,404 | 12/1971 | Ophir | 340/703 |
| 3,683,992 | 8/1972 | Farr | 358/9 |
| 3,774,169 | 11/1973 | Smith | 340/703 |
| 3,781,785 | 12/1973 | Balch | 346/46 |
| 3,828,129 | 8/1974 | Bruck et al. | 358/9 |
| 3,961,306 | 6/1976 | Anstey | 346/46 |
| 4,119,956 | 10/1978 | Murray | 340/703 |
| 4,162,494 | 7/1979 | Bacon | 340/703 |
| 4,183,046 | 1/1980 | Dalke et al. | 340/703 |
| 4,243,984 | 1/1981 | Ackley et al. | 340/703 |

Primary Examiner—Marshall M. Curtis
Attorney, Agent, or Firm—H. Ross Workman; Rick D. Nydegger; Drew S. Hamilton

[57] ABSTRACT

A system and method for producing rapid, high resolution hard color copies from computer-based graphics and image processing including a computer-controlled color video signal graphics system for producing electronically generated digital character and/or graphics data in response to programmed commands that are input to the graphics system. Thereafter, the graphics system transforms the digital data into blue, green and red color video signals which are input to a color camera system through a color control panel that is controlled by a microprocessor. The color control panel sequentially switches each of the red, blue and green video signals through to a video monitor where the signals are transformed into video images on a screen of the monitor. The video images appearing on the screen of the monitor are filtered by a color filter wheel which is also controlled by the microprocessor of the camera system. One of two types of film may be selected for exposure to the filtered video images. The video images are timed by the microprocessor so that the film medium will be exposed to each of the filtered video images for the proper length of time required to sensitize the film for each particular color of video signal. The color control panel of the camera system may also be operated to meter the brightness of the video images appearing on the screen of the monitor and to thereafter adjust the contrast and brightness of the video images.

16 Claims, 2 Drawing Figures

APPARATUS AND METHOD FOR PRODUCING RAPID, HIGH RESOLUTION HARD COLOR COPIES FROM COMPUTER-BASED GRAPHICS AND DIGITAL IMAGE PROCESSING SYSTEMS

BACKGROUND

1. Field of the Invention

The present invention relates to computer graphics and imaging processing systems, and in particular to an apparatus and method for producing rapid, high resolution hard color copies from computer-based graphics and digital image processing systems.

2. The Prior Art

There are many applications where it would be highly useful to provide rapid, high resolution hard color copies from computer-based graphics and image processing systems. Illustrations of such applications include management information systems, architectural rendering, non-destructive testing, medical imaging, electronic news gathering and the like.

One known prior art attempt to produce hard color copies from computer-based graphics and image processing involves a method where the composite color video image appearing on the screen of a monitor is simply photographed. This method has several inherent difficulties. For example, presently the broadcast standards in the United States require a sychronizing frequency and bandwidth standard that corresponds to a sequence standard of 60 hertz. This frequency limitation inherently limits the color spectrum that may be transmitted with such a signal, resulting in poor color definition (i.e. color hue, saturation and lightness) in the photographic reproductions taken from video images produced from such signals.

Moreover, the screen of a television monitor is electronically scanned 60 times every second. The area covered by a complete scan is referred to as a raster. Normally, each raster consists of 262½ scan lines covered in a one-field scan. A video frame or "page" consists of two 262½ line fields, or 525 scan lines which produce the composite video image. The sensitivity of most films is such that color copies of a composite video image have a poor resolution because of the chopping effect which results from the scan lines.

Another prior art approach to producing hard color copies from computer-based graphics has been developed by General Electric Company and is called the Genographics System. This system uses a substantially higher number of scan lines in order to improve the resolution of the copies. Although effective, this system is extremely expensive, which substantially reduces the applications where the system can be cost justified.

Accordingly, what is needed is an apparatus and method for producing hard color copies from computer-based graphics and digital image processing systems which is inexpensive, easy to use and which will reliably produce high resolution copies.

BRIEF SUMMARY AND OBJECTS OF THE INVENTION

The present invention consists of a novel system and method for producing rapid, high resolution hard color copies from computer-based graphics and image processing. The system includes a computer-controlled color video signal graphics system for producing electronically generated digital character and/or graphics data in response to programmed commands that are input to the computer-controlled compositor. Thereafter, the graphics system transforms the digital data into blue, green and red color video signals. The color video signals are input to a color camera system through a color control panel that is controlled by a microprocessor. The color control panel sequentially switches each of the red, blue and green video signals through to a video monitor where the signals are transformed into video images on a screen of the monitor. The video images appearing on the screen of the monitor are filtered by a color filter wheel which is also controlled by the microprocessor of the camera system. One of two types of film may be selected for exposure to the filtered video images. One type of film may be used to produce color prints and the other type of film may be used to produce color slides. The video images appearing on the monitor are timed by the microprocessor so that the film medium will be exposed to each of the filtered video images for the proper length of time required to sensitize the film for each particular color of video signal. The color control panel of the camera system may also be operated to meter the brightness of the video images appearing on the screen of the monitor and to thereafter adjust the contrast and brightness of the video images.

It is therefore a primary object of the present invention to provide an improved system and method for producing rapid, high resolution hard color copies from computer-based graphics and image processing.

Another important object of the present invention is to improve the color definition (i.e. color hue, saturation and lightness) of hard color copies taken from computer-based graphics and image processing.

Yet another significant object of the present invention is to inexpensively improve the resolution of hard color copies taken from computer-based graphics and image processing.

A further object of the present invention is to provide a system and method for producing hard color copies from computer-based graphics and image processing which is both versatile and rapid.

These and other objects and features of the present invention will become more fully apparent from the following description and appended claims taken in conjunction with the accompanying drawings.

DETAILED DESCRIPTION OF THE PREFERRED EMBODIMENT

Reference is now made to the drawings wherein like parts are designated with like numerals throughout.

THE APPARATUS

1. The Computer-Controlled Color Video Signal Graphics System

Figure 1:
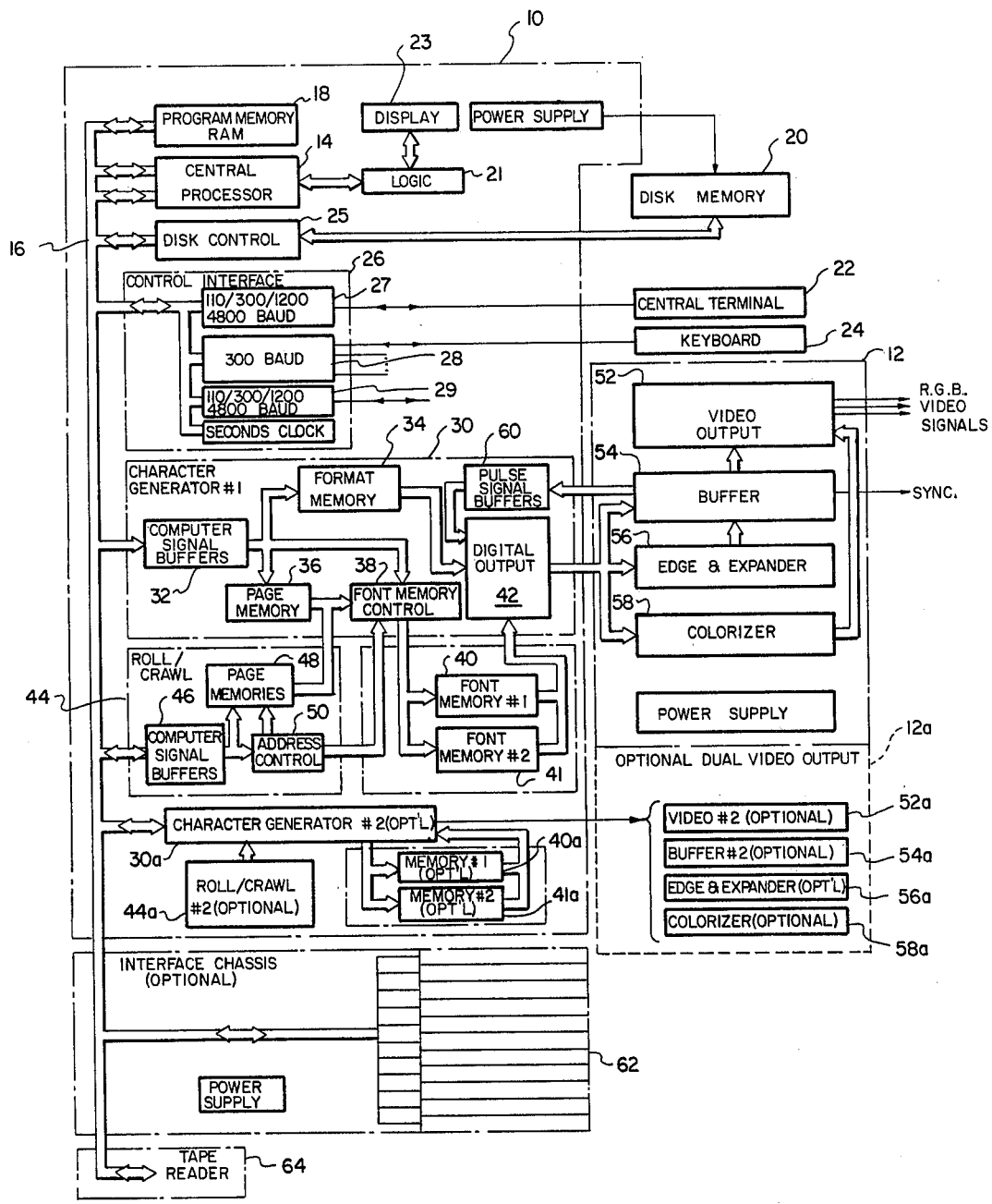
FIG. 1 is a block diagram illustrating the components of a computer-controlled color video signal graphics system that may be used in accordance with the system and method of the present invention.
Figure 2:
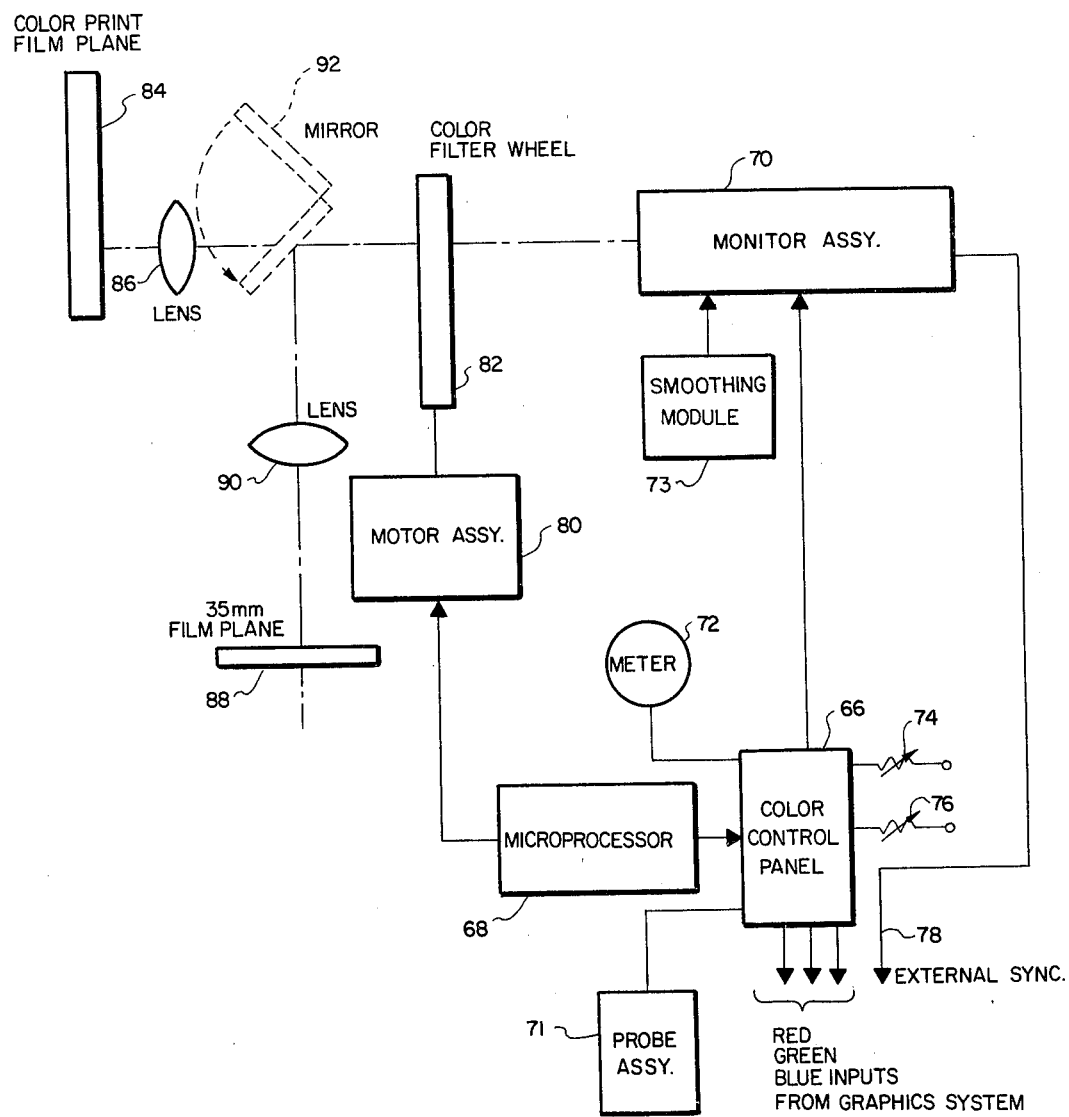
FIG. 2 is a block diagram illustrating a color camera system used for processing the output of the video signal graphics system of FIG. 1 so as to produce rapid, high resolution hard color copies from the computer-based graphics generated by the graphics system.

The apparatus of the present invention consists generally of two components: (1) a computer-controlled color video signal graphics system, which is generally illustrated in FIG. 1, and (2) a color camera system that is controlled by a microprocessor, which is illustrated in FIG. 2. The video signal compositor shown in FIG. 1 is a main frame device that is generally divided into two sections. As hereinafter described in more detail, one of the sections generally designated 10 houses a central processor unit (CPU), memories utilized by the CPU, interface circuitry for communicating with various peripheral I/O devices such as keyboards, terminals and the like, and character generators for producing digital character and/or graphics data in response to programmed commands from the CPU. The other section of the compositor, generally designated 12, houses the video output circuitry which transforms the digital data into separate red, blue and green (RBG) color video signals.

As shown in FIG. 1 the central processor (CPU) 14 is coupled through a main transfer bus 16 to the random access memory (RAM) 18 which contains the program and control data entered from the disk memory 20, central terminal 22, main-frame display 23 and/or system keyboards 24. Digital character and/or graphics data created at the system keyboards 24 by the system operators are stored for future use on the disk memory 20. Disk memory 20 is interfaced to the CPU 14 through a disk control module 25 which controls the moving-arm that moves across the face of the disk when reading or writing data. In the illustrated embodiment one disk memory 20 is shown. However, it is also possible to use the apparatus of the present invention with a dual disk drive which permits use of one disk for the purpose of updating and editing character and graphics data and another disk for purposes of storage of the edited data. As is conventional, character and graphics data that are composed by an operator are stored in pages which may be accessed and recalled at any time for editing or display.

The central terminal 22 and main-frame display 23 provide the man-machine interface to the CPU 14 for system initialization and maintenance checks as desired by the user. Display 23 is interfaced with the CPU 14 through a logic module 21. Central terminal 22 is interfaced through the control interface module 26. The control interface module 26 provides a plurality of subcircuits 27-29 which are designed to interface with various other peripheral devices, such as keyboard 24 and other customer equipment, at the specified band rates of each particular peripheral device.

The character generator module 30 is controlled by the central processor 14 through the main transfer bus 16. Commands from the CPU 14 are entered at the signal buffers 32 provided in the character generator 30. The CPU command signals may then be routed to the format memory 34, the page memory 36 or the font memory control 38. The format memory 34 is used to store all data relating to the background color and luminance level for each page of information that is stored. The page memory 36 is used to store the particular type of character and/or graphics data that is to be displayed on a particular page, including the color information for each character and the outline or edge (i.e. shadowing) information for each character. The front memory control 38 is used to store the address information for accessing each of the various fonts containing the different character types or graphics which are stored in the font memories 40-41.

The character and/or graphics data stored in the page memory 36 is communicated to the font memory control 38 and provides the information which permits the font memory control 38 to access the particular type of character and/or graphics data that is stored in the font memories 40-41. The character and/or graphics data accessed in font memories 40-41 is then transferred to a digital output module 42 which prepares the character and/or graphics data and the background data from the format memory 34 for combining in the video section 12.

The roll/crawl module 44 controls the movement in the horizontal and/or vertical directions of the information contained on each page. The roll/crawl data entered at the system keyboards 24 is controlled by CPU 14 and sent to the CPU signal buffers 46, where it is then routed to the page memories 48 and address control 50. The page memories 48 are used to store the character and graphics information in a series of discrete address locations which may be time sequenced by the address control module 50. The address control module 50 periodically changes the addresses so that the page of character or graphics information may be made to appear to roll up across the monitor screen, thus simulating vertical movement, or to crawl across the monitor screen, thus simulating horizontal movement. The address control 50 also communicates the time varying address information to the font memory control 38, which controls the display of the particular character or graphics information contained in the font memories 40-41.

The digital data in the digital output module 42 is then communicated to the buffer 54, edge and expander module 56 and colorizer module 58 of the video output section 12. The buffer 54 communicates with the pulse signal buffers 60 so as to control the flow of information from the digital output module 42. The edge and expander and colorizer modules 56 and 58 transform the digital data into video signals which correspond to the particular type of outlining or shading and the particular color desired for the video characters or graphics. The composite video signals are then output by the video output module 52 as separate red, blue and green (RBG) video signals. Importantly, transmission of the separate RBG video signals accommodates a wider bandwidth than a composite video signal, meaning transmission of a broader color spectrum and improved color definition in the photographic reproductions derived therefrom as described further below.

As further illustrated in FIG. 1, a second character generator 30a in combination with the second roll/crawl module 44a and font memories 40a-41a may be provided along with a second video output section 12a. The character generator 30a, roll/crawl module 44a, font memories 40a-41a and video output section 12a are all identical to the corresponding portions of the compositor system described above. The dual character generator and dual video output are optional and provide expanded capability for fully utilizing the central processor 14. Thus, while the output of one of the character generators and video output sections is on line, the other character generator and video output section may be used for previewing or editing character and graphics information.

An optional interface chassis 62 may also be provided which permits information to be input from teletypes or other general type of input/output peripheral devices as may be desired by a particular user.

A high speed tape reader 64 is included to provide an alternate load path for program and diagnostic data.

Computer-controlled color video signal graphics systems like that generally described above are known in the art and are commercially available. For example, one such graphics system is manufactured by Fernseh Inc., the video corporation of Bell & Howell and Robert Bosch, and is designated as the TCG-3000 Graphics System Compositor I ™.

2. The Color Camera System

The RBG video signals from the video signal graphics system are input to the color camera system through a color control panel 66. The color control panel 66 is controlled by a system controller, which in the illustrated embodiment comprises a microprocessor 68, as hereinafter more fully described.

The microprocessor 68 is preprogrammed to control the color control panel 66 so that each of the video signals from the compositor may be switched through in sequence to the monitor assembly 70. The monitor assembly 70 in turn transforms the video color signals into video images on the screen (not shown) of the monitor.

The monitor assembly 70 may be, for example, a high quality flat screen monitor, or any other suitable type of video imaging device. The video image appearing on the screen of the monitor 70 is electronically conditioned to essentially eliminate the presence of raster line gaps which are normally seen in a 525 line frame video picture. This is accomplished by a smoothing module 73 which electronically shifts the raster scan lines in a series of small vertical increments. The resultant effect is to eliminate the poor resolution or choppiness that would otherwise be present in the hard copy.

The color control panel 66 is also provided with a probe assembly 71 and meter 72 which together may be used to measure the brightness of the video image appearing on the screen of the monitor 70. The probe assembly 71 consists of a light sensitive device which may be placed on the screen of the monitor 70 and which then causes an output reading to appear on the metering device 72, reflecting the brightness of the video image. The brightness of the video image may then be adjusted by adjusting a potentiometer 74. The contrast of the video image may be adjusted by potentiometer 76. The video image produced by the monitor 70 is synchronized by an output synchronizing signal from buffer 54 (see FIG. 1) of the video signal graphics system.

The microprocessor 68 is also connected to a motor assembly 80 which is used to drive a color filter wheel 82. As is conventional, the color filter wheel 82 filters all colors except the particular color for the video image which is to be transmitted through the color filter wheel. The filtered video image is used to expose either of two types of film. One type of film is located at the color print film plane 84. Film used at the film plane 84 is focused by a lens 86 and is used to produce 8"×10" color prints or 8"×10" transparencies. One type of film that has been found suitable for use is the type 808 Polacolor ® 2 film.

The filtered video image may also be reflected by a mirror 92 into a second lens 90 which focuses the image on a second film plane 88. Film plane 88 is used to expose 35 millimeter film to the video image for the purpose of producing color slides. The mirror 92 is rotatable so that it may be removed when it is desired to expose the film located at film plane 84 for producing color prints, and may be used to divert the video image by reflection onto the second film plane 88 when it is desired to produce 35 millimeter slides.

THE METHOD

The method used to employ the apparatus of the present invention to provide rapid, high resolution hard color copies from computer-based graphics and image processing will be readily apparent to those of ordinary skill in the art.

The operational programs used for controlling the central processor 14 of the video signal graphics system are typically provided by the manufacturer and are part of the standard package. The character and graphics data for each page of information are entered through the keyboard 24 by an operator. The character and graphics data may also be entered through other types of input devices which may be interfaced to the graphics system, such as teletypes graphics compose systems and the like.

The digital character and graphics data are organized so as to output such information on separate pages, where each page corresponds to a video frame. The character generator module 30, roll/crawl module 44 and font memories 40–41 are used to control the placement and movement of the character and graphics data for each page of information. The digital data output by the character generator 30 is then transformed into RBG color video signals using the edge and expander module 56, colorizer module 58, and the video output module 52.

The RBG color video signals are input to the color control panel 66 (see FIG. 2) and the microprocessor 68 then switches each of the color video signals through in sequence to the monitor assembly 70, where they appear as video images on the screen of the monitor assembly 70. The video images appearing on the screen of the monitor assembly 70 are filtered by the color filter wheel 82 and the filtered video images are then used to expose the film located at either of the film planes 84 and 88 as described above.

The apparatus and method of the present invention may be advantageously used for making 8"×10" color prints and 35 millimeter color slides having exceptionally high resolution and accurate rendition of color hue, saturation and lightness. High throughput copying may provide up to thirty 8"×10" prints or sixty 35 millimeter slides per hour. Applications for the apparatus and method of the present invention are diverse, including management information systems, CAD/CAM, process control, cartography, architectural rendering, graphic arts, publishing, remote sensing, nondestructive testing, medical imaging, and the like. Thus it will be appreciated that the apparatus and method of the present invention are extremely versatile and may be used in a variety of applications.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A versatile, rapid and high resolution hard copy system for producing color copies from computer-based graphics and image processing, said system comprising:
   (1) a computer-controlled color video signal graphics system comprising
      (a) a CPU and a program memory electronically coupled to said CPU;
      (b) a character generator means for producing electronically generated digital character and/or graphics data in response to commands from said CPU;
      (c) input/output means for entering program and control data to said CPU; and
      (d) a color video signal generating means for transforming said digital data from said character generator means into a plurality of separate color video signals; and
   (2) a color camera system comprising
      (a) a video imaging device for transforming said separate color video signals into video images;
      (b) a system controller;
      (c) a color control means electronically interconnected between said video imaging device and said system controller, said color control means being coupled to said separate color video signals output from said color video signal generating means, and said color control means being controlled by the system controller such that said plurality of separate color video signals are sequentially switched through to said video imaging device;
      (d) a color film medium optically exposed in a synchronous manner to the sequence of video images being generated on said video imaging device; and
      (e) color separation means placed in the optical path between said color film medium and said video imaging device, said color separation means being electronically connected to said system controller and controlled thereby so as to permit separate synchronous exposure of said color film medium to each video image corresponding to a separate color signal switched through to said video imaging device.

2. A system as defined in claim 1 wherein said color video signal graphics system comprises:
   first and second character generator means for producing electronically generated digital character and/or graphics data in response to commands from said CPU; and
   first and second color video signal generating means for transforming said digital data from said first and second character generator means into a plurality of separate color video signals.

3. A system as defined in claim 1 wherein said color video signal graphics system further comprises interface means for electronically coupling said CPU to information input from one or more peripheral devices.

4. A system as defined in claim 1 wherein the color control means of said color camera system comprise:
   means for metering the level of brightness of the video images produced by said video imaging device;
   means for adjusting the brightness of said video images;
   means for adjusting the contrast of said video images.

5. A system as defined in claim 1 wherein said color film means comprise:
   a first film medium and a first focusing lens for focusing the video images produced by said video imaging device onto said first film medium;
   a second film medium and a second lens for focusing said video images onto said second film medium; and
   means for selectively diverting said video images away from said first lens and first film medium and into the optical path of said second lens and said second film medium.

6. The system of claim 5 wherein said first film medium is adapted for use in making color prints and wherein said second film medium is adapted for use in producing 35 millimeter color slides.

7. A system as defined in claim 5 wherein said means for diverting said video images from said first lens and said first film medium to said second lens and said second film medium comprises a mirror for reflecting said video image.

8. A system as defined in claim 1 wherein said color separation means comprise:
   a color filter wheel; and
   an electric motor for driving said color filter wheel in response to commands from system controller.

9. A system as defined in claim 1 wherein said system controller comprises a microprocessor.

10. A system as defined in claim 1 wherein said video imaging device comprises:
    a video monitor assembly; and
    a smoothing module for electronically conditioning said video image so as to essentially eliminate the presence of raster line gaps therein.

11. A method of producing rapid, high resolution hard color copies from computer-based graphics and image processing, said method comprising the steps of:
    electronically generating digital character and/or graphics data;
    electronically transforming said digital data into a plurality of separate color video signals;
    sequentially switching each said separate color video signal through to a video imaging device so as to transform each said switched color video signal into a video image;
    synchronously exposing a color film medium to the sequence of video images being generated on said video imaging device; and
    synchronously filtering said video images so as to permit separate exposure of said color film medium to each video image corresponding to a separate color video signal switched through to said video imaging device.

12. A method as defined in claim 11 wherein each color video signal that is switched through to said video color imaging device is displayed as a video image for a selected time period that is dependent upon the sensitivity of said film medium to the particular color of the video signal that is being switched through to said monitor.

13. A method as defined in claim 11 wherein said separate color video signals comprise red, blue and green video color signals.

14. A method as defined in claim 11 further comprising the steps of:
    metering the brightness of the video images produced by said video imaging device;
    adjusting the level of brightness of said video images; and
    adjusting the level of contrast of said video images.

15. A method as defined in claim 11 wherein said step of exposing said film medium comprises the steps of:
providing a first color film medium for producing color prints by exposure to said video images;
providing a second color film medium for producing 35 millimeter color slides by exposure to said video images; and
selectively exposing one of said first or second film media to said video images.

16. A method as defined in claim 11 further comprising the step of eliminating raster line gaps in said video image by vertically shifting said video image in a series of increments.

* * * * *

UNITED STATES PATENT AND TRADEMARK OFFICE
CERTIFICATE OF CORRECTION

PATENT NO. : 4,373,156

DATED : February 8, 1983

INVENTOR(S) : Robert B. Pfannkuch and Fred W. Grab

It is certified that error appears in the above—identified patent and that said Letters Patent is hereby corrected as shown below:

Abstract, line 19, insert the following after "filtered video images.": --One type of film may be used to produce color prints and the other type of film may be used to produce color slides.--

Column 3, line 49, "band" should be --baud--

Column 3, line 64, "front" should be --font--

Signed and Sealed this

Third Day of May 1983

[SEAL]

Attest:

GERALD J. MOSSINGHOFF

Attesting Officer

Commissioner of Patents and Trademarks